United States Patent
Trim et al.

(10) Patent No.: US 11,480,437 B2
(45) Date of Patent: Oct. 25, 2022

(54) TRANSPORTATION SYSTEM USED BY INDIVIDUALS HAVING A VISUAL IMPAIRMENT UTILIZING 5G COMMUNICATIONS

(71) Applicant: International Business Machines Corporation, Armonk, NY (US)

(72) Inventors: Craig M. Trim, Ventura, CA (US); Lakisha R. S. Hall, Upper Marlboro, MD (US); Gandhi Sivakumar, Bentleigh (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 16/691,043

(22) Filed: Nov. 21, 2019

(65) Prior Publication Data

US 2021/0156702 A1    May 27, 2021

(51) Int. Cl.
  *G01C 21/34*    (2006.01)
  *G06Q 10/04*    (2012.01)
  (Continued)

(52) U.S. Cl.
  CPC .......... *G01C 21/3438* (2013.01); *G06F 3/01* (2013.01); *G06F 3/016* (2013.01); *G06Q 10/02* (2013.01);
  (Continued)

(58) Field of Classification Search
  CPC ....... G01C 21/3438; G06F 3/01; G06F 3/016; G06Q 10/02; G06Q 10/047; G06Q 50/30;
  (Continued)

(56) References Cited

U.S. PATENT DOCUMENTS

| 6,370,475 B1 | 4/2002 | Breed et al. |
| 6,526,352 B1 | 2/2003 | Breed et al. |

(Continued)

OTHER PUBLICATIONS

N. Harrington, L. Antuña and Y. Coady, "ABLE Transit: A Mobile Application for Visually Impaired Users to Navigate Public Transit," 2012 Seventh International Conference on Broadband, Wireless Computing, Communication and Applications, 2012, pp. 402-407, doi: 10.1109/BWCCA.2012.72. (Year: 2012).*

(Continued)

*Primary Examiner* — Krishnan Ramesh
(74) *Attorney, Agent, or Firm* — Mark Bergner

(57) ABSTRACT

A computer-implemented system and method for a transportation system comprises, using a processor associated with a service, initializing information collectors and response monitors by loading configurations, user settings, and data structures to capture device information from a plurality of devices that each run a virtual agent (VA). Fifth generation (5G) communication links are established between 5G server orchestration service instances (SOSIs) and respective VAs on the devices. Captured live status information by the SOSIs is received from various devices. A 5G dynamic ad-hoc network (DAHN) connects a user device of a user having visual impairment and a vehicle stop device, the DAHN creation being triggered by the user device entering a stop device boundary. An SOSI receives user-vehicle stop information after the connecting to the DAHN. Control information is transmitted to the vehicle device VA related to the user when the user device is located within the stop boundary.

20 Claims, 7 Drawing Sheets

(51) Int. Cl.
*G06Q 50/30* (2012.01)
*G06Q 10/02* (2012.01)
*G07C 5/00* (2006.01)
*H04W 84/18* (2009.01)
*H04W 8/12* (2009.01)
*H04W 4/021* (2018.01)
*H04W 4/029* (2018.01)
*H04W 64/00* (2009.01)
*H04W 84/00* (2009.01)
*G06F 3/01* (2006.01)

(52) U.S. Cl.
CPC ........... *G06Q 10/047* (2013.01); *G06Q 50/30* (2013.01); *G07C 5/008* (2013.01); *H04W 4/021* (2013.01); *H04W 4/029* (2018.02); *H04W 8/12* (2013.01); *H04W 64/003* (2013.01); *H04W 84/005* (2013.01); *H04W 84/18* (2013.01)

(58) Field of Classification Search
CPC ...... G07C 5/008; H04W 4/021; H04W 4/029; H04W 8/12; H04W 64/003; H04W 84/005; H04W 84/18
USPC .......................................................... 701/533
See application file for complete search history.

(56) References Cited

U.S. PATENT DOCUMENTS

| | | | |
|---|---|---|---|
| 7,928,864 B2 * | 4/2011 | Park | G09B 29/10 |
| | | | 340/994 |
| 9,046,375 B1 | 6/2015 | Emigh | |
| 9,747,655 B2 | 8/2017 | Smith et al. | |
| 9,797,730 B2 | 10/2017 | Kolodziej | |
| 9,903,730 B1 | 2/2018 | Berhe et al. | |
| 9,970,779 B2 | 5/2018 | Kim et al. | |
| 10,096,316 B2 | 10/2018 | Kalns et al. | |
| 10,192,189 B2 * | 1/2019 | Bhatt | G06Q 10/08355 |
| 10,266,113 B1 * | 4/2019 | McCulloch | B60Q 9/008 |
| 2016/0110799 A1 * | 4/2016 | Herring | G01G 19/4144 |
| | | | 705/26.81 |
| 2017/0289047 A1 | 10/2017 | Szilagyi et al. | |
| 2018/0152910 A1 | 5/2018 | Ryu et al. | |
| 2019/0028587 A1 | 1/2019 | Unitt et al. | |
| 2019/0053010 A1 | 2/2019 | Edge et al. | |
| 2019/0053148 A1 | 2/2019 | Lee et al. | |
| 2019/0059067 A1 | 2/2019 | Lee et al. | |
| 2019/0340961 A1 * | 11/2019 | Davies | G09F 13/165 |
| 2020/0073482 A1 * | 3/2020 | Levesque | G06F 3/014 |
| 2020/0100057 A1 * | 3/2020 | Galon | G01C 21/3679 |
| 2020/0275243 A1 * | 8/2020 | Ueno | H04W 40/22 |
| 2020/0380798 A1 * | 12/2020 | Frankel | G06Q 10/083 |

OTHER PUBLICATIONS

G. H. Flores and R. Manduchi, "A Public Transit Assistant for Blind Bus Passengers," in IEEE Pervasive Computing, vol. 17, No. 1, pp. 49-59, Jan.-Mar. 2018, doi: 10.1109/MPRV.2018.011591061. (Year: 2018).*

Azenkot et al., "Enabling Building Service Robots to Guide Blind People," A Participatory Design Approach, https://www.ncbi.nlm.nih.gov/pmc/articles/PMC2964893/, ©2016 IEEE, 8 pgs.

Borcoci, "End-To-End, Multi-Domain and Multi-Tenant Aspects in 5G Network Slicing," Softnet 2018 Conference, Oct. 14-18, 123 pgs.

Chen et al., "User-Centric Ultra-Dense Networks for 5G: Challenges, Methodologies, and Directions," https://www.researchgate.net/publications/301791939, Apr. 2016, 9 pgs.

Ivanchenko et al., "Staying in the Crosswalk: A System for Guiding Visually Impaired Pedestrians at Traffic Intersections," https://www.ncbi.nlm.nih.gov/pmc/articles/PMC2964893/, printed Apr. 2, 2019, 5 pgs.

Shuminoski et al., "Advanced QoS Provisioning and Mobile Fog Computing for 5G," Hindawi, Wireless Communications and Mobile Computing, vol. 2018, Article ID 5109394, 13 pgs.

Wikipedia, "5G," https://en.wikipedia.org/wiki/5G, printed Apr. 2, 2019, 14 pgs.

Ye et al., "A Network Slicing Framework for End-To-End QoS Provisioning in 5G Networks," accessed Feb. 18, 2019, 9 pgs.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

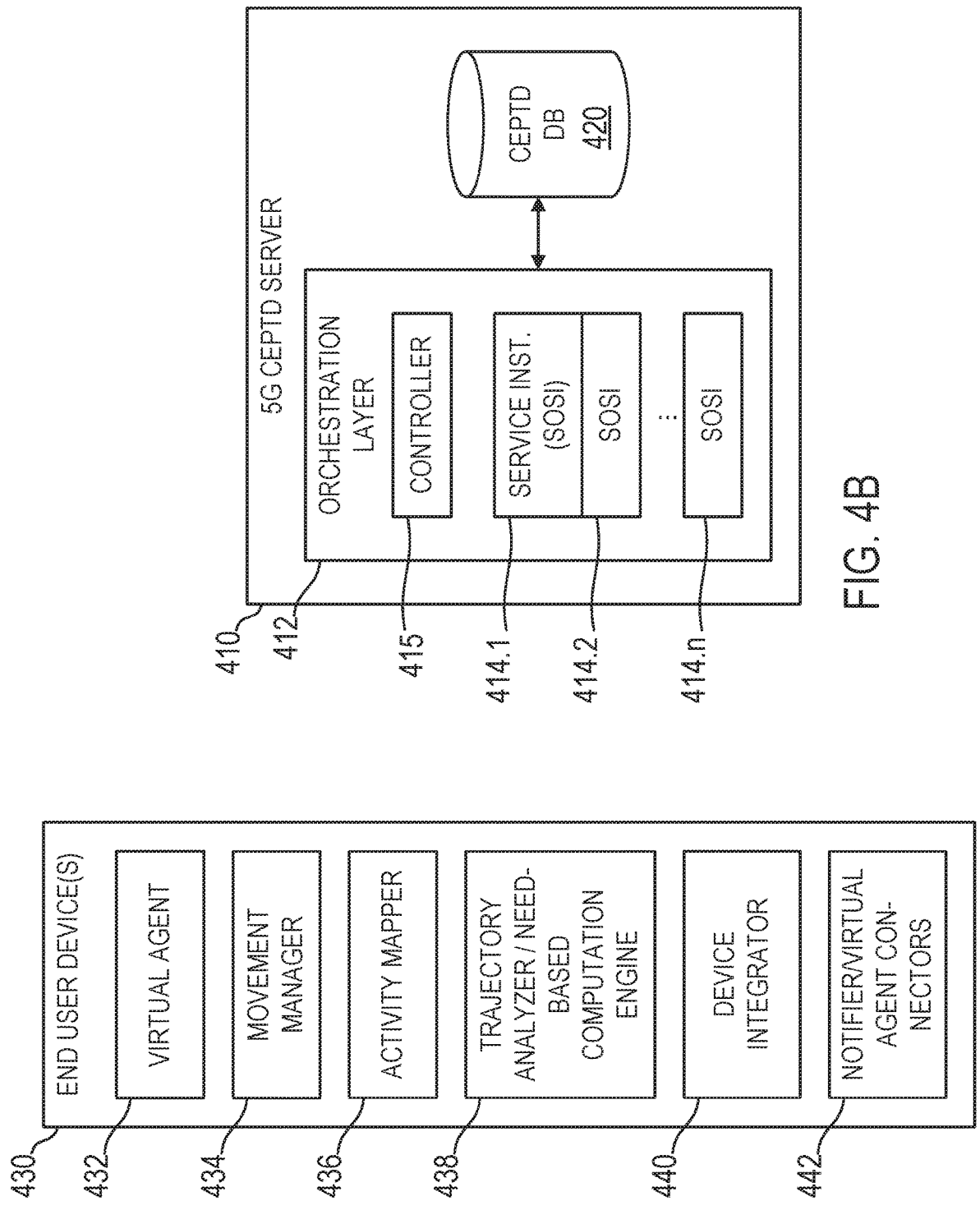

TRANSPORTATION SYSTEM USED BY INDIVIDUALS HAVING A VISUAL IMPAIRMENT UTILIZING 5G COMMUNICATIONS

BACKGROUND

Disclosed herein is a system and related method for allowing individuals having a visual (or possibly other) impairment to use a transportation system utilizing 5G communications. The use of 5G technologies may allow for more efficient and effective communications for all entities involved in a transportation system.

SUMMARY

According to one aspect disclosed herein, a computer-implemented method is provided comprising, on a server and using a processor of a server, initializing information collectors and response monitors by loading configurations, user settings, and data structures to capture device information from a plurality of devices that each run a virtual agent (VA). The method further comprises establishing fifth generation (5G) communication links between 5G server orchestration service instances (SOSIs) and respective VAs on a plurality of the devices. The method further comprises receiving, from the plurality of devices and via a telco channel, captured live status information by the SOSIs. The method further comprises receiving, from a vehicle device VA, vehicle status information, and ingesting, by a first SOSI of the SOSIs, the vehicle status information, based on a predefined boundary associated with the vehicle. The method further comprises connecting to a 5G dynamic ad-hoc network (DAHN) comprising a user device of a user having a visual impairment and a vehicle stop device, the DAHN creation being triggered by the user device entering a predefined stop boundary of the stop device. The method further comprises receiving, by a second SOSI of the SOSIs, user-vehicle stop information after the connecting to the DAHN, and transmitting control information to the vehicle device VA related to the user when the user device is located within the stop boundary.

According to another aspect disclosed herein, a transportation system is provided, comprising a processor configured to initialize information collectors and response monitors by loading configurations, user settings, and data structures to capture device information from a plurality of devices that each run a virtual agent (VA). The processor further establishes fifth generation (5G) communication links between 5G server orchestration service instances (SOSIs) and respective VAs on a plurality of the devices. The processor further receives, from the plurality of devices and via a telco channel, captured live status information by the SOSIs, and receives, from a vehicle device VA, vehicle status information. The processor further ingests, by a first SOSI of the SOSIs, the vehicle status information, based on a predefined boundary associated with the vehicle. The processor connects to a 5G dynamic ad-hoc network (DAHN) comprising a user device of a user having a visual impairment and a vehicle stop device, the DAHN creation being triggered by the user device entering a predefined stop boundary of the stop device. The processor receives, by a second SOSI of the SOSIs, user-vehicle stop information after the connecting to the DAHN, and transmits control information to the vehicle device VA related to the user when the user device is located within the stop boundary.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIG. 4B is a block diagram of one or more embodiments of a transportation system showing additional detail, according to some implementations.

DETAILED DESCRIPTION

Figure 1:
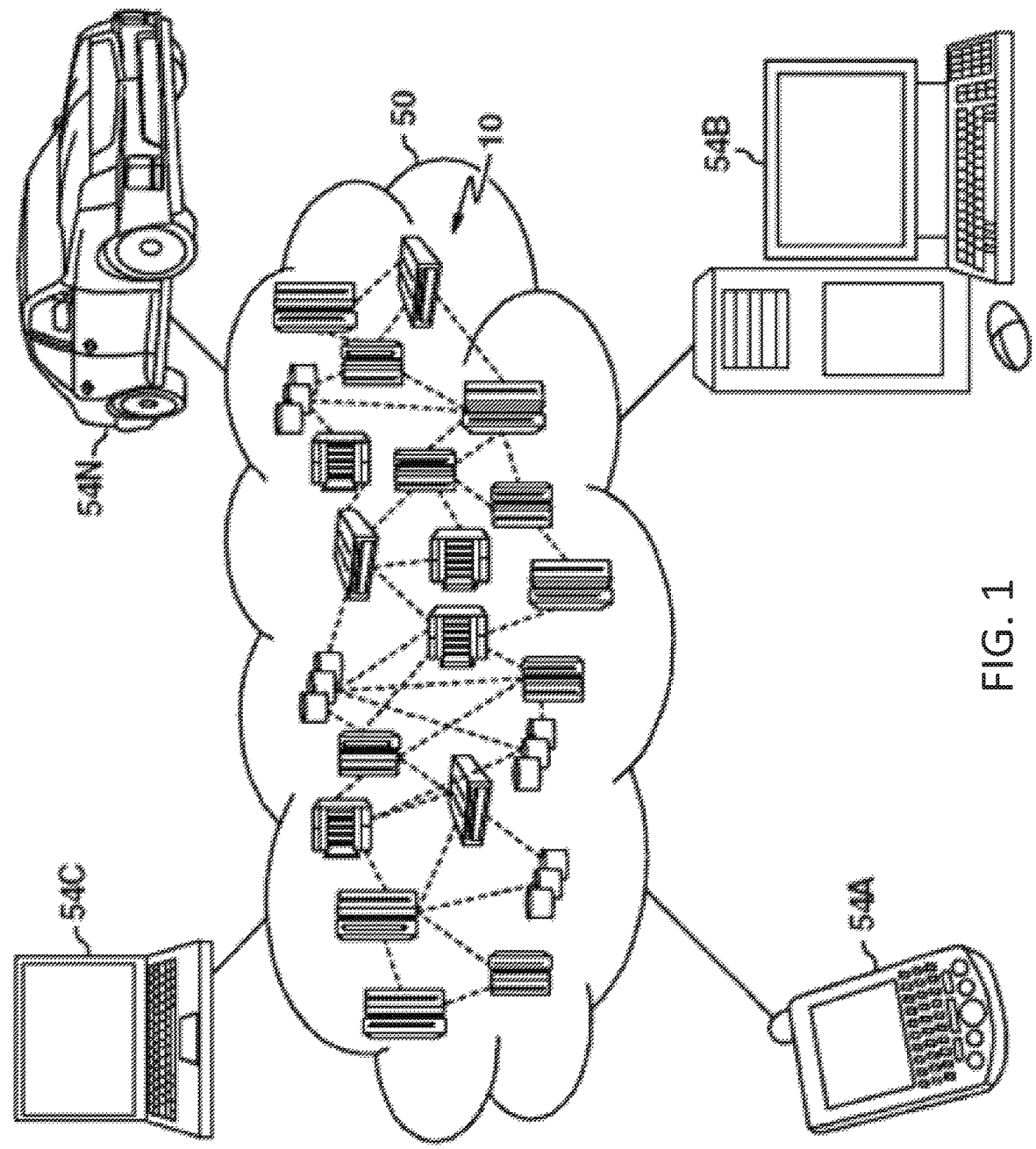
FIG. 1 depicts a cloud computing environment according to an embodiment of the present invention.

In order to better provide information to a user having a visual impairment when attempting to utilize a transportation system, 5G network technology may be utilized to provide an improved experience for the user. Various smart devices may work together cooperatively and provide data that is real-time accessible within the 5G network. Data may be ingested and processed by an application on a server through, e.g., the user of service instances. These service instances may be coordinated by a controller in an orchestration layer of the server.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computering in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
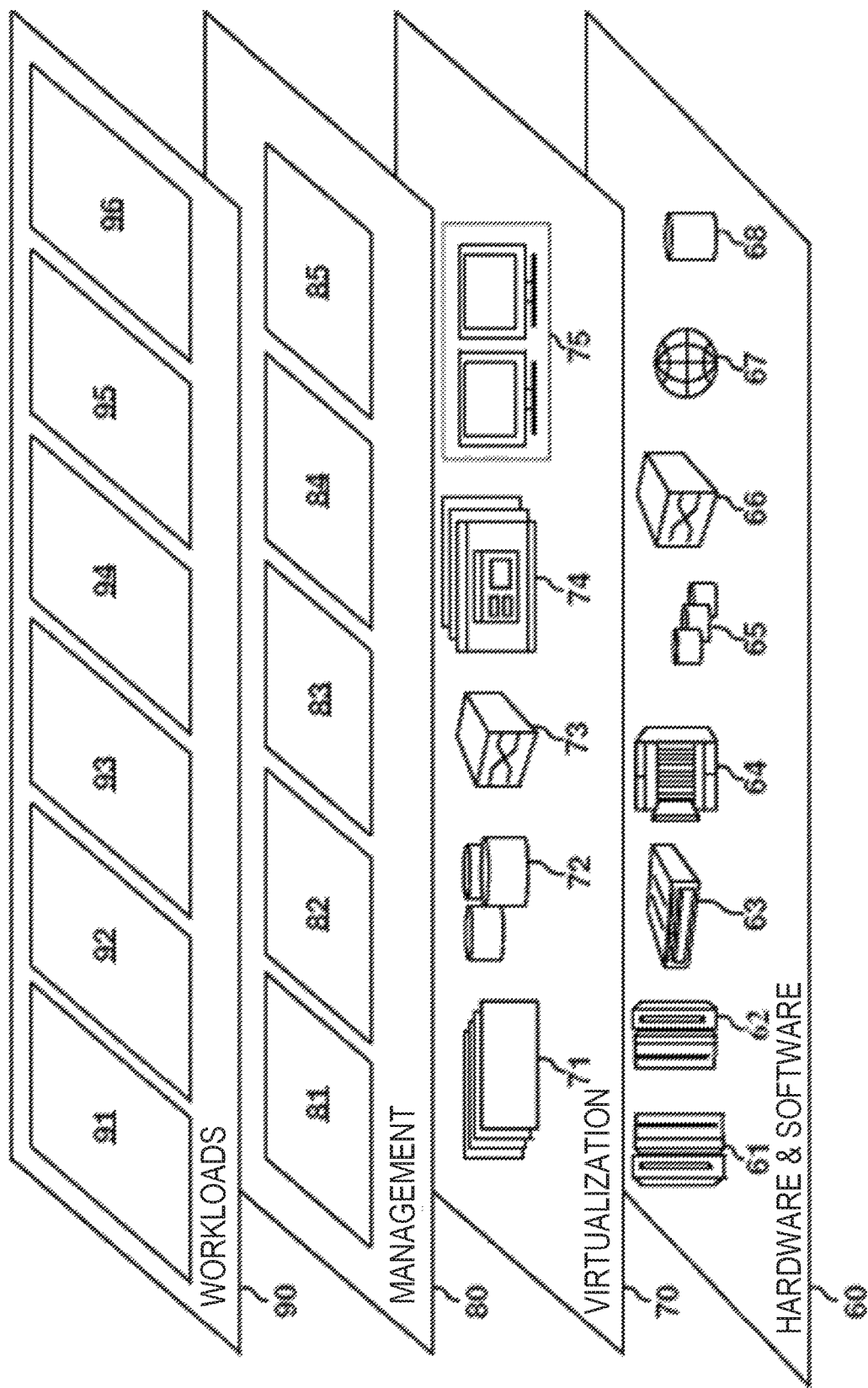
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
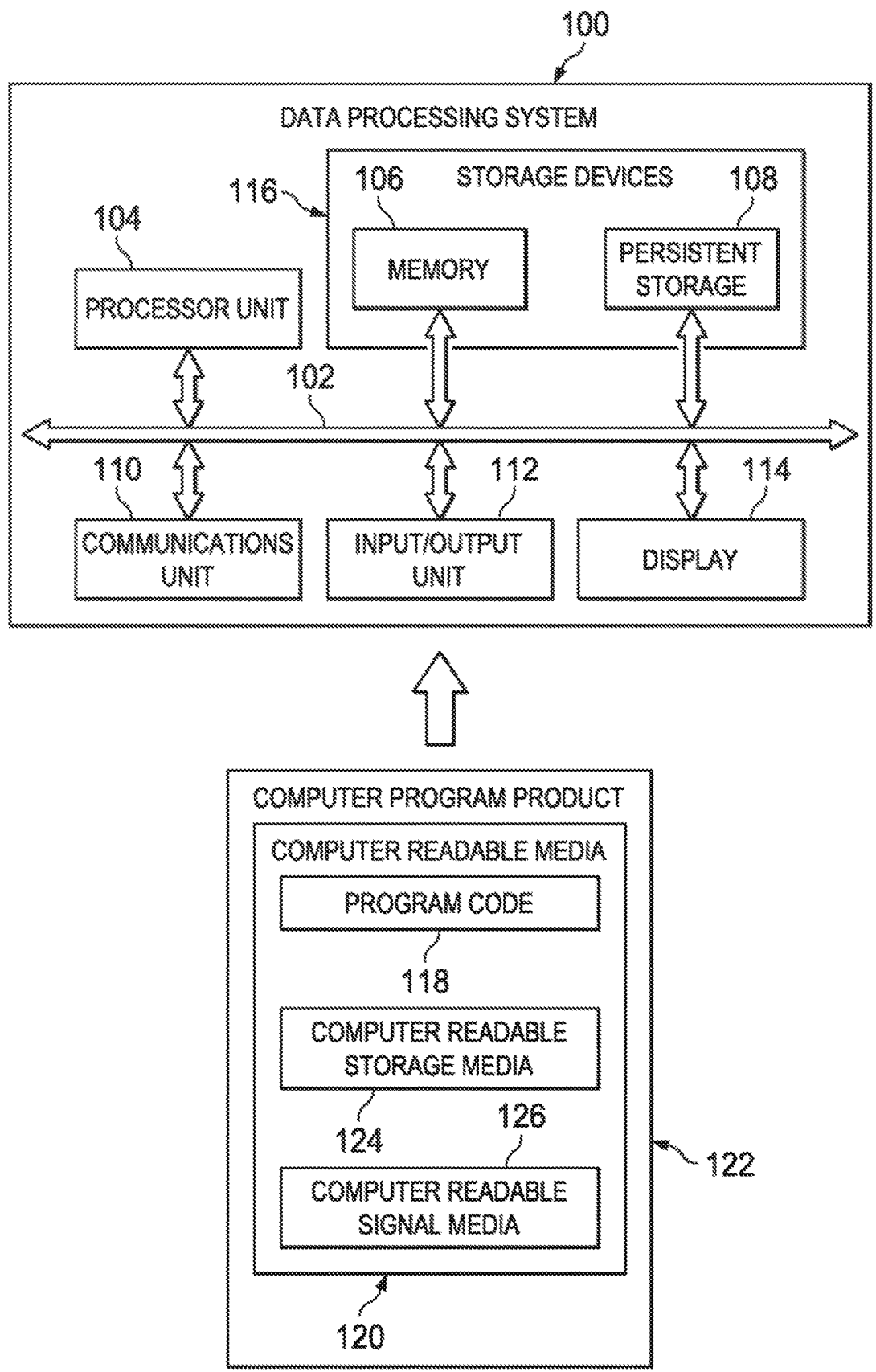
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Transportation System

Fifth generation (5G) technology refers to the next generation of wireless technology that is replacing the fourth generation long-term evolution (4G LTE) standard. 5G mobile networks and wireless systems, involve telecommunications standards beyond the current 4G/international mobile telecommunications (IMT)-Advanced standards. 5G communications have a higher capacity than 4G, communications allowing a higher density of mobile broadband users, and supporting device-to-device, more reliable, and massive machine communications. 5G communications equipment also has a lower latency than 4G equipment and lower battery consumption, allowing, e.g., a better implementation of the Internet of Things.

One aspect of these technologies is a "new radio" that may use massive multiple input multiple output (MIMO) antennae that may help to achieve wireless network capabilities surpassing those of 4G LTE technology. This 5G network provides and/or improves technology areas including artificial intelligence (AI) by breaking the barrier of various aspects of prior technologies like sedentary operations, lower bandwidth, etc. The 5G technology may serve as a rich enabler to push the dependent technologies to a higher level by permitting a mobility bandwidth on the order of one giga-bit per second (GBPS), by using a convergence of IoT device access (e.g., an integration and sharing of IoT and networking infrastructure), and other advanced technologies. One of the exploitable features of 5G is the network itself being intelligent and cognitive.

An individual having a visual impairment, or, possibly, any other impairment, disability, or special condition in general (herein referred to as a "user") may require special attention, since the impairment may limit the extent to which the user may efficiently and effectively interact with transportation systems that have not historically evolved to address such a visual impairment. Although some components have been provided in the transportation industry, e.g., guiding mechanisms in traffic signals that include audio-enhanced signs for the user, these may not be present in all locations and/or with all services.

Furthermore, the components for creating a comprehensive system involving external third-party intelligent devices (e.g., buses, trains, and other transport vehicles) are not currently present. Described herein is a system and related method that may make use of 5G technologies to assist the user. This may be done by integrating devices used by individuals who are visually challenged with devices used by IoT enabled public transport vehicles using 5G based virtual agents (VAs). An awareness of the drivers or automated systems of public transportation vehicles for people having a visual impairment may allow special efforts to be made, and a use of personalized characteristics of the users may assist them more efficiently in their travels.

A vehicle, as described herein, may be an automobile, bus, train, boat, or any other machine used to transport passengers, and which may or may not have a driver or pilot. The vehicle may be a standalone vehicle or it may connect to a centralized vehicle server via a system network. The vehicle 410 may comprise various user aids, such as a ramp and/or a wheelchair lift. The vehicle may also comprise sensors that may be utilized to detect various conditions associated with the vehicle (e.g., positions of ramps, lifts, doors, individuals, etc.) or road conditions (e.g., potholes or other bumps, sharp corners, etc.), or weather conditions (icy, wet/rainy) that may impact a user's ability to enter and exit the vehicle. Intelligent decision-making and user communications of the vehicle may be incorporated in a vehicle processor comprising hardware and software that may implement, e.g., various Artificial Intelligence (AI) used by the vehicle. The vehicle processor may be a part of the vehicle communication system or it may be a separate component that interacts with the vehicle communication system.

Information may be exchanged by making use of VAs to share information among users, the vehicles they may be traveling in, an orchestration layer on a 5G CEPTD, and other IoT devices. This may be used, e.g., to provide dynamic signaling of vehicles on the road based on the impaired person detection. IaaS/PaaS service providers may be able to provide more accurate and optimal real-time data placement using 5G service orchestration and may provide an ability to push data based on realistic situations by self-adjusting monitoring levels based on real-time information utilization.

As defined herein, orchestration means the planning, coordinating, controlling, and/or choreographing inputs and outputs of multiple system components to achieve a desired outcome. An orchestration service is a service that may be used to perform one or more orchestration functions within the system. An orchestration layer is an architectural layer in a server or cloud computing device that may perform the orchestration service. A server orchestration service instance (SOSI) is a service instance that may be initiated to interact with one or more VAs. Information from SOSIs may be shared with each other, and may be overseen by an orchestration service controller.

A use case is considered in which a user wants to use public transportation, such as a city bus service. When the user reaches the bus stop, she does not know which bus has arrived unless an audio announcement system is active on the bus stop. When the user determines that the correct bus has arrived, she needs extra time to move from her current position at the bust stop, such as a bus stop seat to the bus door for boarding. To make matters more difficult, the bus driver may be unaware that the user needs help or some form of service at this bus stop, and that the bus should be stopped until the user boards the bus. This creates disorganization in the system, and may cause individuals having an impairment to experience trouble using the service.

A method and apparatus may be provided within the context of a 5G telecom network. Use of a 5G network may provide a number of benefits. A first benefit is increased speed of communications, including a faster operating speed for device to device communication and other faster channeling mechanisms offered as a base service in 5G telecom network. Additionally, the 5G service orchestration and infrastructure management layer may offer an integrated multi-service platform as a basic service that is capable of performing domain level cognition that is not present in 4G or other telecom standards. A network with a cognitive process may perceive current network conditions, plan, decide, act on those conditions, learn from the consequences of its actions, all while following end-to-end goals. The cognition loop may utilize uses artificial intelligence techniques inside its states (learning techniques, decision making techniques, etc.). It may sense the environment and plan actions according to input from sensors and network policies, decide which scenario fits best its end-to-end purpose using a reasoning engine, and act on a chosen scenario. It may learn from the past (situations, plans, decisions, actions) and use this knowledge to improve decisions in the future. Such a network may utilize both radio spectrum and wireless station resources opportunistically, based upon the knowledge of such resource availability.

Additionally, use of a 5G network allows infrastructure arbitration and capability discovery from remote IoT devices placed with users, which may add value for optimal and real time implementation of this service. This may not be possible in traditional 3G or 4G telecom network. Finally, the use of a 5G telecom network may provide an E2E multi-domain manager that contains the capability of information collection from various eNodeBs in the area, and hence provides a more efficient solution, as opposed to a traditional telecom network, where this capability comes under a roaming data exchange, which is much more latency prone.

This apparatus works using a collaboration of a 5G service orchestration layer along with an end-to-end (E2E) multi-domain management layer at a domain level 5G orchestration, which may integrate various devices that may be utilized by the user. Such user devices may include a smartphone, wearables, a smart walking stick or cane that is IoT enabled (for a user with a visual impairment), and/or other IoT enabled devices. The user devices may collect a current real-time location of user, detect a location of a vehicle stop, such as a bus stop/station or train station, or any other public transportation stop using 5G based location mapping and GPS based interconnects.

The agent installed on the user device may invoke a Virtual Agent (VA) and conform itself for a destination location where the user wants to go using natural language communication. Once the system is told or infers that the user wants to travel to a destination location, the apparatus working in the service orchestration and infrastructure management layer for 5G telcom communications collects information related to surrounding vehicles using IoT enabled interconnect and internal in-bound API connection to the E2E multi-domain management system of the 5G architecture. Based on the user location, an in-scope computation area may be identified, and a multi-domain manager may track the surrounding vehicles, their route, destination location, stop details, and other related information, and calculate situational insights. The situational insights may be, for example, related buses, their times, and en-route buses. These situation insights may be transferred to the agent VA system for further communication framing.

The vehicles near the user may be notified using natural language and/or vehicle control instructions to indicate the presence of the user and that the user may need a special service. Once the public transport vehicles are notified of the presence of the user at a particular stop, they may take some specific action, such as alerting a driver that the user is present at the next stop and requires additional handling (e.g., additional time to board, extension of ramps and/or lifts, physical help, and the like).

In addition to providing assistance to the user, these efforts may benefit the overall community by, e.g.: 1) making the user more independent; 2) making the public transportation system better by providing better service to the user; 3) reducing the number of accidents; and 4) making the user experience a life that is less impacted by their disability.

Figure 4A:
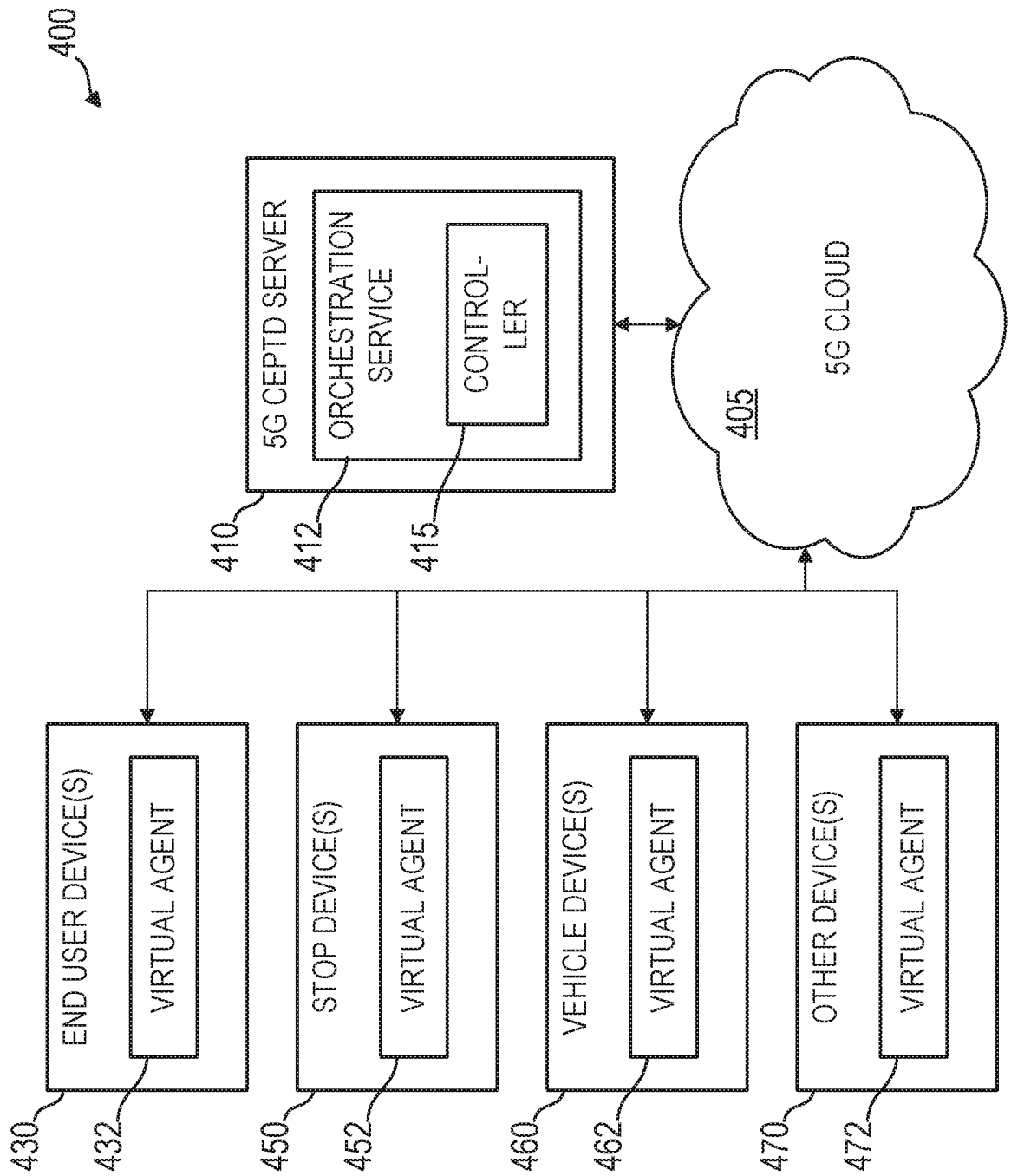
FIG. 4A is a block diagram of one or more embodiments of a transportation system, according to some implementations.

FIG. 4A is a high-level block diagram, according to some embodiments, that illustrate the CEPTD system 400 made up of a 5G CEPTD server 410 that interacts with a number of devices 430, 450, 460, 470 (which may be referenced collectively or by way of example by reference number 430) via a 5G cloud network 405. Some or all of the devices 430 may be IoT devices. The system 400 and its respective device may correspond to the system shown in FIG. 1, with the nodes 10 being examples of the various devices 430 . . . 470 described herein, and the cloud computing environment 50 may be an example of a network environment utilized by the system 400. The functional abstraction layers 60-90 illustrated in FIG. 2 are layers that may be utilized in the system for performing various functions described herein. The orchestration layer may correspond, by way of example to the workloads layer 90 or even higher-level layers. The devices 430 . . . 470 as well as the server 410 may each be represented by the data processing system 100 as illustrated in FIG. 3, and software media used to hold instructions for executing and performing various functions described herein when executed on a processor may be, for example, the computer program product 122 shown in FIG. 3.

The cognition-enabled public transportation domain (CEPTD) system 400 described herein may comprise two primary parts: an agent, illustrated in FIG. 4A as virtual agents (VAs) 432, 452, 462, 472 (which may be referenced collectively or by way of example by reference number 432), and a controller 415 that may be provided on, e.g., a 5G CEPTD server 410. The controller 415 may perform orchestration across the various components and devices 430 in the system 400. The VAs, which are components of the agent (e.g., agent subsystems) may be provided in the end user devices 430 (the devices of the individuals with the visual impairment, VA 432), vehicles 460 (VA 462), vehicle stations and stops 450 (VA 452), other devices 470 (VA 472), and in a server or centralized computer or service orchestration layer of a 5G telecom network. The service orchestration layer may have multiple services running including the services described herein. The agent subsystems may be initialized: a) when the device that they are associated with is powered on, b) upon receiving a startup instruction, or c) based on any other type of initiating event.

The user device 430 may utilize its VA 432 to communicate with the vehicle device 460, the server 410, or other devices 450, 460, 470 in the system 400. The VAs 432, 452, 462, 472 may be downloaded to the respective devices from, e.g., the server 410 via, e.g., an app store. The user device 430 may be dedicated to supporting the virtual agent 432, or may be a general-purpose user communication device, such as a smart phone. The user device 430 may also be associated with a microphone that allows the user to communicate with other system components using voice or audio. The user device 430 may contain a speaker that is capable of producing audio, possibly exclusively, for the user. Thus, the user device 430 may provide for interactive two-way communications between the user and others.

Information about the user may be stored in a user database of the user device 430. This information may include information about the user herself (identifying information, address, phone, nature of handicap, etc.) as well as device information, travel information, and any other information.

A variety of possibilities exist for establishing communications. In some embodiments, the user undergoes a registration process prior to attempting travel. In various embodiments, the user may communicate with the server 410 to provide it with information that may subsequently be accessed by, e.g., the vehicle device 460 or other devices. The virtual agent 432 may be a standalone app, implemented via a browser interface, or take on some other form. The virtual agent 432 may convey information about the user, the user's devices, situation, travel, etc. that is stored in the user database or entered by the user to the server 410, which may store this information in a server database. In one example, the server database may comprise a user portion containing information about users of the system. The server database may also comprise a route portion that stores, e.g., map information, including real-time information such as traffic, road conditions, distances, directions, and weather of station status information at stations or stops associated with the vehicle. The server database may also comprise a vehicle portion that contains information about vehicles used by the system such as type (train, bus, automobile, etc.), capabilities to assist handicapped users (e.g., ramp, wheelchair lift, telecoils, etc.) and other vehicle-related information.

If the user registers with the server 410, the server 410 may store the user information in the user portion in a record that uniquely defines the user (e.g., by a unique user ID or device ID (smartphone phone number, MAC address, etc.)). By storing this user information ahead of time, the server 410 may have relevant information (e.g., type of assistance preferred by the user or other preferences that make the user's experience more pleasant) handy without requiring the user to constantly provide this information. Such a pre-travel registration process may permit the user to use a more convenient information entry system, such as a personal computer, that may not be present when the user has set out on a trip. The route portion may be populated, e.g., by access to commercially available map and route databases. Similarly, the vehicle portion may be populated by a registration app that allows vehicles to register and change their information on the server 410. The intelligence of the server 410 may be provided by a server processor that may utilize hardware and software to execute various functions of the vehicle system server 410 and may incorporate features such as AI.

FIG. 4B is a block diagram illustrating additional details of the 5G CEPTD server 410 and an end-user device 430 within the CEPTD system 400. Initialization of different devices may be performed based on the characteristics of a particular device. For example, an initialization in the user device 430 may be performed when the user device 430 is powered on. An initialization of the vehicle device 460 may be performed when the vehicle engine is started. An initialization of the stop device 450 may be performed according to, e.g., a weekly schedule.

The initialization may load initialization information, such as configuration and user settings, including respective data structures, that may be utilized in capturing information by the device 430. The initialization information may be stored in a CEPTD database 420 that may reside on the server 410 and/or that may be present in each of the devices forming a part of the system. The CEPTD database 420 may contain information on users, vehicles, and stops, as well as configuration information, applications, etc. for other devices within the system. Once the devices 430 of the system 400 are initialized, a communication link may then be established between 5G service instances (or Server Orchestration Service Instances (SOSIs)) (414.1-414.$n$, collectively or by way of example 414) and respective VAs 432 within the devices 430.

The devices 430, such as those that are IoT devices, may be triggered to capture live status using, e.g., collection daemons and response monitoring processes, based on some event, such as the expiration of a predefined time interval, at which time information may be collected and provided to the VA 432. Based on some predefined criteria, the collected information may then be transmitted over a 5G channel in the 5G network 405 to a respective service instance 414 at a service location in an orchestration layer 412 where it may be aggregated and processed based on, e.g., boundaries. The 5G network may make use, e.g., of a dedicated traffic channel (DTCH) which may be used for transmission of user data to/from a user equipment. This is a logical channel type that may be used for transmission of unicast uplink and downlink user data. For example, in the use case, the user device 430 may begin tracking the user's basic position (with the user's permission) once the device is initialized using a movement manager 434. The basic position may be determined based on a global positioning system (GPS) located on the device 430, proximity to other communication elements, and the like. The server 410, with its orchestration layer 412, may provide the capability to infer insights from collected data from various resources, such as end user devices 430, vehicle stop IoT devices 460, transport vehicle sensors and devices 460, and other sources. Other sources from which data may be provided may include user calendar data, which may be integrated into scheduling functions of the system. Information may be collected that can lead to personality insights and habits. For example, normal awake and asleep times may be inferred based on times when user activity and inactivity is detected, and location information provided. The system may, e.g., prompt in users and others using natural language. For example, natural language prompts may be provided to the drivers of public transport vehicles to give them notice of a person having a visual impairment at a next stop.

Tracking movement of the use may be determined based on predefined characteristics such as location, speed, etc. that the user is waiting for the vehicle at the stop. The user status of "waiting for a vehicle" may be determined by a number of variables. For example, a user who pauses for a predefined amount of time within a stop boundary (e.g., a predefined boundary associated with the stop) may be determined to be "waiting". Or, if the user's position can be accurately obtained, the user's mere presence within predefined boundaries (e.g., a bench at the stop), may be used to make a determination that the user's status is "waiting".

A user-provided status communicated with, e.g., the user's device 430 may also be utilized in the determination that the user is in a "waiting" status.

The VA 452 in the stop device 450 may then be invoked to collect a response for travelling details using natural language. By way of example, in the use case, the stop device 450 may ask the user, "where are you going today?", and the user may say, "I am going to the Belmont stop". In other embodiments, such communication may proceed via the user device 430 once its VA 432 (or other VA within the system) recognizes that the user is waiting for the vehicle at the stop. The user may provide information about their preferences or any other pertinent information at this point (e.g., age, information on vision (or other) impairment, special characteristics) prior to this point (e.g., when leaving their residence, when installing or updating the user device VA 432, etc.). The user's information may be stored in a database on the user's device 430, in a database of the server 410, or on any of the other devices 450, 460, 470 that the user may interact with.

An activity mapper 436 may permit more detailed information about the user's position to be collected once the user's position is determined to be within a certain distance of a vehicle stop or other relevant location. For example, the user may walk past a first vehicle stop before arriving at a second vehicle stop, which is the stop the user intends to use. As the user approaches the first stop, the activity mapper 436 may sample the user's position every ten seconds instead of every minute. Since the user continues walking at about the same pace, the activity mapper 436 may determine that the user is not intending to stop at the first vehicle stop. However, as the user approaches the second vehicle stop, the user sits down at a bench. The activity mapper 436 may determine that the user intends to get on a bus at the second vehicle stop, based on a lack of movement on the part of the user.

A trajectory analyzer/need-based computation engine 438 may consider various options for the user to get to a desired location. For example, if the server 410 is attempting to get the user to a 10:00 a doctor's appointment, it may consider the user's current position and decide the fastest way for the user to get to the desired location. For example, even though the user may be closer to the first vehicle stop that has a bus going towards the desired location, the bus may arrive at the desired location later than one from the second vehicle stop. The user may specify what their greatest need is, e.g., minimize walking distance (in which case the first stop may be chosen, but that will arrive at the desired location later), or getting to the desired location sooner (in which case the second stop may be chosen, that involves more walking distance).

The trajectory analyzer 438 may have the ability to calculate vehicle trajectory paths and vehicle directions, and may further have a mechanism for asking the vehicles about relevant information related to the vehicles, such as an end stop location, route information, and other interrelated data. The trajectory analyzer 438 may further classify the vehicles and categorize their state, such as "en-route" vehicles and "not-in-scope" vehicles for optimized analysis.

In some implementations, a 5G ad hoc network may be created between user devices 430, vehicle stop IoT enabled devices 450, and potential vehicle devices 460. This ad hoc network may be created by, e.g., a device integrator 440, and may be utilized to convey information within the ad hoc network. Relevant information may be collected from the VAs (the user device VA 432, the stop VA 452, the vehicle VA 462, and/or other device VA 472) may then be parsed, extracted, analyzed, and transmitted to orchestration layer service, such as the controller 415. In the use case, the VA may transmit the information it knows to the service. For example, it may transmit the user's indication of going to the Belmont stop, that the user is waiting at the Adams stop, and that there are twenty five other people at the stop intending to travel on the bus heading in the direction of the Belmont stop. The user device VA 432 and/or the vehicle VA 462 may be used to determine or indicate a successful user boarding of the vehicle. Image sensors, for example, may be used to determine the user being in a seated position. Image sensors, device detectors, and the like may further determine a degree of crowding at the stop, as well as the presence of other individuals who may have some form of impairment, and this may be useful information in terms of boarding times, special access items, such as ramps, that may need to be deployed, etc. A dynamic ad-hoc network (DAHN) may comprise other user devices 430 along with bus stop devices 450 and other location sensing devices 470, if any, that have the capability to connect to the 5G service orchestration (controller 415) for information exchange.

Vehicle route information may be accessible as well. For example, the vehicle device 460 VA 462, may contain information about the vehicle's route. Such information may also be present in the CEPTD database 420 and communicated to the vehicle VA 462, the user VA 432, the stop VA 452, and other device VAs 472. Information about the capabilities of the vehicle or vehicle accommodations to accommodate individuals with an impairment (e.g., available aids, such as a ramp, handicapped seating near the doors, etc.) may be provided within the network, and such information may be dynamic. For example, if a vehicle has a seating capacity of five seats for individuals with a handicap, but four of those seats are already occupied, then the vehicle VA 462 may communicate the available seating capacity of only one remaining handicapped seat. This may or may not be a problem for those with a visual impairment.

The server 410 may be able to integrate and interact with a smart vehicle control unit of the vehicle device 460 and send/receive control information in order to assist the driver in working with the user. Such control information may be text or audio that is presented to a display of the vehicle device 462. Such control information may also be actual control signals for controlling hardware associated with the vehicle. For example, a vehicle ramp may be instructed by the smart vehicle control unit to automatically lower upon the vehicle stopping at the next stop when a person with a visual (or other) impairment is present. An application program interface to services of vehicle data may be provided that permits application developers to easily create applications for the system and easily exchange information with, e.g., services of vehicles from an end-to-end multi-domain manager to an orchestrator service of the server to collect long distance vehicle status that may be used by other components of the system.

Information about a particular stop may be provided by the stop device VA 452. For example, the stop device VA 452 may provide information related to the stop's capabilities with respect to various handicaps. In the use case, the stop device VA 452 may provide the information that the Belmont stop has an elevator that may be used for the user to transfer from the bus to a train.

When alternate routes exist, the VAs 432 may determine through communications over the 5G network 405, a best one for the user to take based on any number of factors (e.g., speed, convenience, accessibility, etc.). An en-route vehicle extractor in the CEPTD may determine IoT capable vehicle devices 460 having a similar route to the user destination, and provide inputs to the client instances to initiate VA communications, such as communications about the route or destination. The vehicle VA 462 may have a route manager that senses a start of the journey to the destination along with the direction. The route manager may trigger movement control based collected inputs via the vehicle VA 462.

A notifier/virtual agent connectors engine 442 may be provided in the device 430. This notifier 442 may be used to inform the user with information relevant to the route or destination. For example, once the best route for the user has been determined, the user may be notified as to which vehicle stop the user needs to be at, and at what time. A notifier in the VA 462 of the vehicle device 460 may be used, e.g., to inform the vehicle driver of the presence of the user who may require special assistance. Such special assistance may simply involve allowing more time for the user to board the vehicle, providing audio or haptic instructions to the user, or deploying special equipment, such as a ramp, to assist the user.

Figure 5:
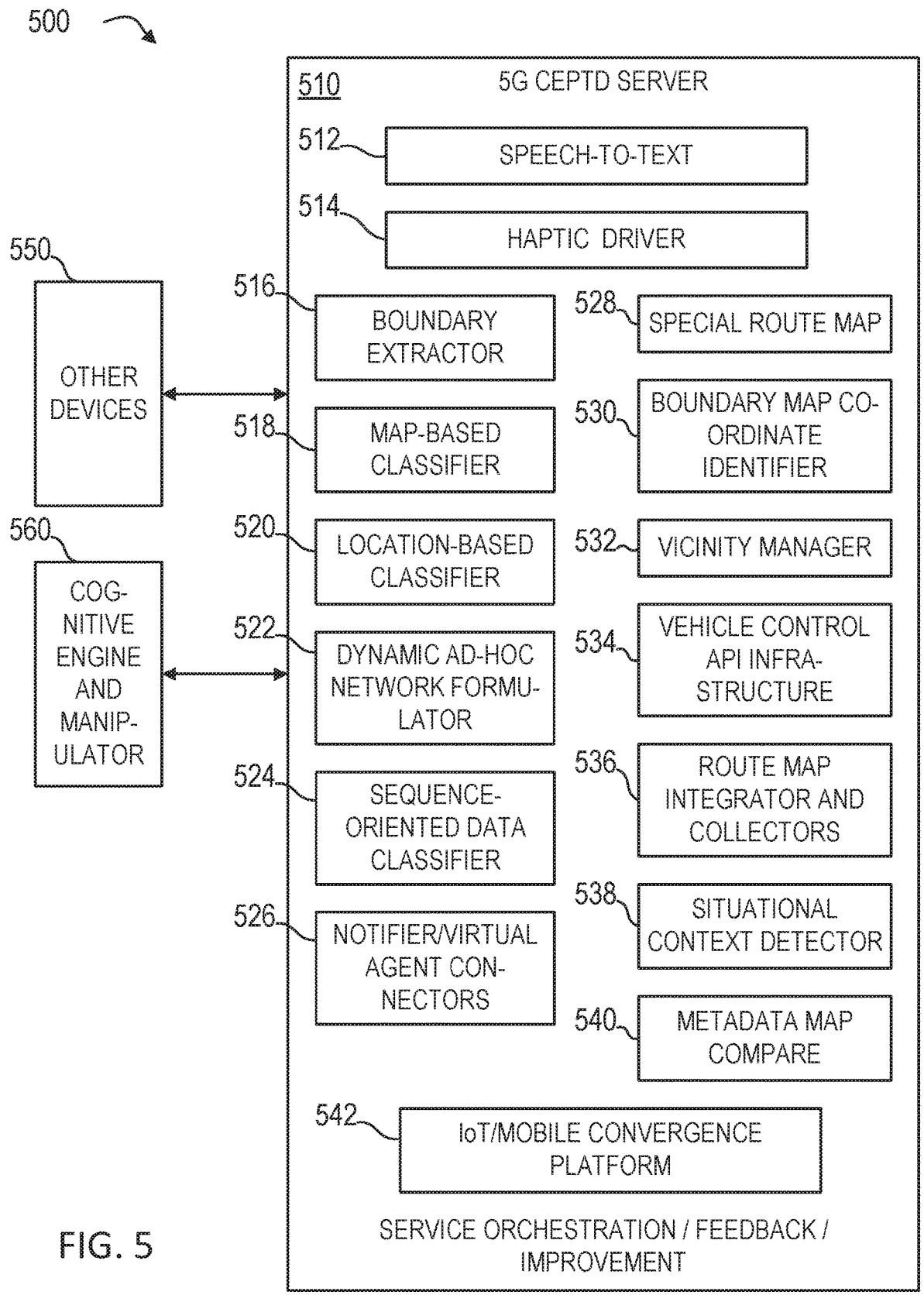
FIG. 5 is a block diagram of one or more embodiments of the transportation system server, according to some embodiments.

FIG. 5 is an expanded block diagram of a system 500, such as the system 400, that illustrates various additional components. The CEPTD service 510, which may correspond to the 5G CEPTD server 410, may include server side components, client side components, and/or service side components, as they may also be run as a service in the 5G network. The server 510 may include, for example, a speech-to-text translator 512 (and/or a corresponding text-to-speech translator) that may be used to assist the user when the user is communicating with other elements in the system. The server 510 may also comprise a haptic driver 514 that may be used to communicate with the user via their user device 430. For example, the haptic driver 514 may be used to send a series of vibrations to the user device in order to indicate that the user is coming to within a vicinity of a station at which they should board their vehicle to their destination. Other types of signals may be haptically provided to the user to convey information, based on a touch sensation of a screen on which information may be additionally presented.

Geographic components may be provided in the server 510. These may include a boundary extractor 516 that may be utilized to provide boundaries or geofences defining particular regions, such as stops, stations, vehicle coverage areas, and the like. A map-based classifier 518 may be provided to determine road information (addresses, streets, highways, interstates) as well as road conditions (construction/repair, weather-related, etc.), border information (city, county, state), and the like. A location-based classifier 520 may be provided that determines a specific location of the user, vehicle, or other movable entity within a particular boundary or on a map as determined by the boundary extractor 516 and/or the map-based classifier 518.

A dynamic ad-hoc network formulator 522 may be provided that assists in the formation of an ad-hoc network between at least two of the following: the user device 430, the stop device 450, the vehicle device 460, other devices 470, and the server 410, 510 (and/or the respective agents of the devices 432, 452, 462, 472). The ad-hoc network may permit 5G communications between network members that are both fast, due to high data rates, and responsive, due to the low latencies of the 5G network. A sequence-oriented data classifier 524 may be provided. Such a classifier 524 may provide information related to user destinations requiring multiple elements or journey legs. For example, a user may need to travel by bus for a first leg of a journey, by train for a second leg of the journey, and walk for a final leg of the journey. The sequence classifier 524 may be utilized for determining a best sequence of journey legs to arrive at a particular destination, and may take into account things like road closures, traffic, and the like.

A notifier/virtual agent connectors component 526 may work with the dynamic ad-hoc network formulator 522 (or may work independently of it) in order to assist in establishing connections between entities involved in a trip from a start to a destination by the user. By way of example, the user may be provided with notification in the form of a voice announcement on their device 530 indicating the arrival of the correct vehicle to board by way of the system providing this information to the user device VA 432. For example, the server 510 may send data indicating mode: "voice message", content: "your vehicle will arrive in two minutes", or mode: "haptic vibrate", content: "vibrate two short pulses". Similarly, the driver of the vehicle that will be picking up the user may receive notification via data sent to the vehicle device 460 VA 462. For example, such data may include mode: "voice message", content: "there are two persons with a visual impairment at the next stop".

Other supporting components may be provided to help correctly obtain and parse information from various dynamic computing platforms. A special information detector component for the routes and detection of people having a visual impairment may enable the end user to provide inputs by way of VAs situated on end device. A special route map component 528 may be provided to assist the user with a specific route to her destination. The Route manager may sense the start of the journey along with the direction and triggers the movement control based collected inputs via VA. A boundary map coordinate identifier component 530 may be provided to establish different boundaries associated with defined areas within the system—for example, boundaries associated with stops, boundaries associated with vehicle routes, boundaries associated with the user, etc. A route map integrator and collector component 536 may be provided as an en-route vehicle extractor in CEPTD that, e.g., determines IoT capable vehicular devices having a similar route and provides inputs to the client instances to initiate VA discussion. A situational context detector component 538 may be provided to assess various attributes about a particular context associated with a user, stop, vehicle, or other system element. A metadata map compare component 540 may be provided to consider metadata associated with map elements that can subsequently be utilized in determining, e.g., best routes for users. An IoT/mobile convergence platform component 542 may be provided to aggregate and share information of components within the network. Some of these components may be located on the other devices 550, such as the user device 430, or functionally split between components on the other devices 550 and on the server 510.

A vicinity manager 532 may use existing location-based platforms (e.g., map services and the like) to identify nearby vehicle stop devices 450 in the vehicle stop (based on devices served by, e.g., a current e-Node Base station or nearby e-Node Base stations. The vicinity manager 532 may triggers notification alerts until the user is out of a predefined boundary area associated with the vehicle stop. Once the vehicle reaches vehicle stop, the driver of the vehicle may be instructed to wait until the user has boarded the vehicle and/or offer assistance to the user. These instructions and notices may make use of natural language instructions. The vicinity manager 532 may indicate that travel on the route may continue once the user (and others) have boarded the vehicle safely. A vehicle control API infrastructure component 534 may be provided to allow developers to utilize a standard set of routines for performing various operations within the system.

A cognitive engine and manipulator (CEM) 560 may be provided that is able to gather information from a number of sources and provide it to the server 510. For example, the CEM 560 may be able to access the user's calendar either from the user device 430 or a calendar server used by the user for events, appointments, and the like. The CEM 560 may be able to access relevant information about vehicle schedules and the like, permitting the server 510 to coordinate travel times with the user's schedule and locations of events on the schedule in order to provide the user with relevant times associated with their destination and various legs of their journey. The CEM 560 may be able to take advantage of personality information and insights. For example, the CEM 560 may be able to determine that the user is a morning person, and is most active in the hours before noon—and that in the afternoon, the user normally moves slowly and prefers a nap after lunch.

Figure 6:
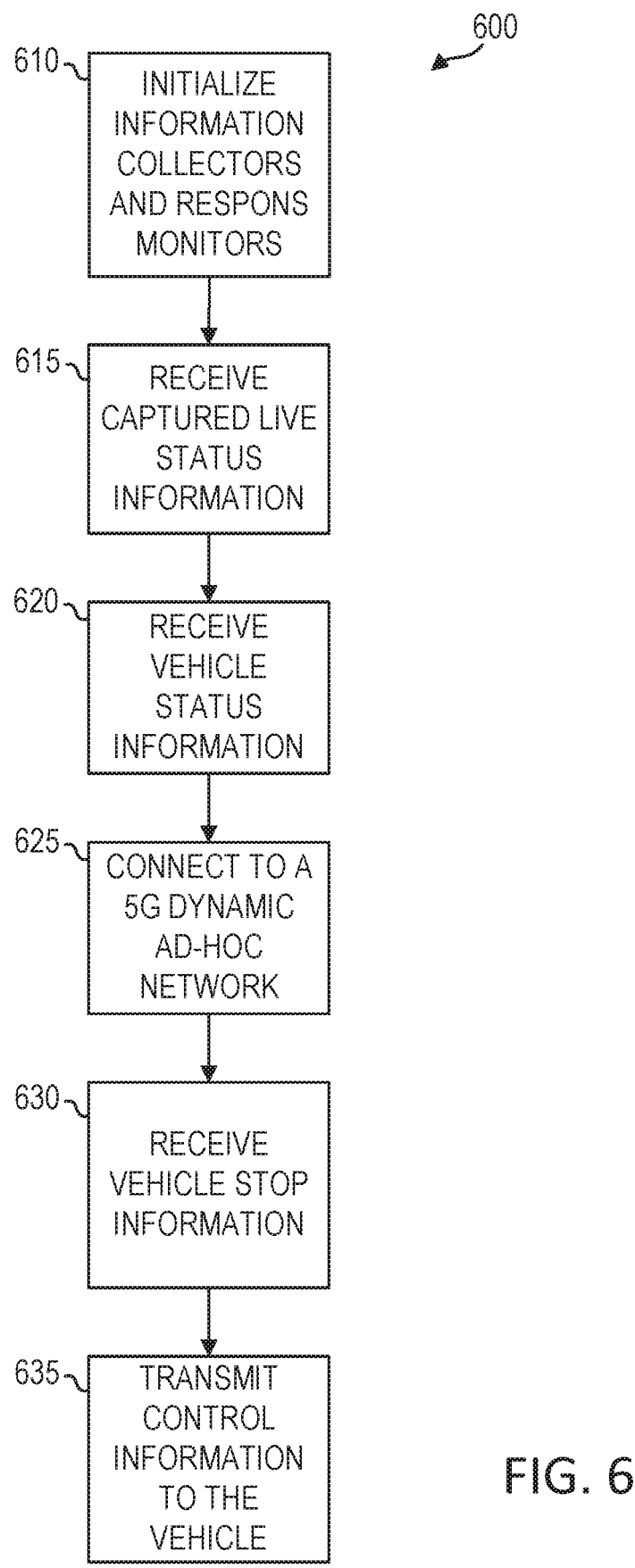
FIG. 6 is a flowchart of one or more embodiments of a process disclosed herein.

FIG. 6 is a flowchart illustrating a possible process that may be used within the system 400. In operation 610, information collectors and response monitors may be initialized by loading configurations, user settings, and data structures to capture device information from a plurality of device that each run a VA 432, 452, 462, 472. Information collectors may be the VAs for devices or SOSIs for the server 410. Similarly, response monitors may be the VAs for devices or SOSIs for the server 410, depending on the information flow. Either a VA or an SOSI may request information from the other and the other may respond to such a request. VA software may be downloaded from the server or acquired from a repository of software versions. Different images of the software may be provided for different devices and/or configurations may be instantiated through the use of configuration files. Various user settings may be applied as well. The configuration files may be applied, e.g., upon power up of the device or the SOSI. The VAs may, in one example, send a message to the server 410 that it is to instantiate an SOSI 414 once the VA is fully up and running, and the SOSI 414 may then establish a communications channel over which the VA may communicate with the server 410 (operation 615)—5G communication links may be established between SOSIs and respective VAs on a plurality of the devices. Although in some implementations there is a one-to-one correspondence, it is possible for one-to-many, many-to-one, and many-to-many relationships to be formed between VAs and SOSIs. In operation 620, vehicle status information is received an ingested by one of the SOSIs that is associated with the vehicle VA and based on a predefined boundary associated with the vehicle.

In operation 625, the server 410 may connect, e.g., via one or more SOSIs with the 5G DAHN that comprises a user device of the user, such as a user having a visual impairment, and a vehicle stop device. The DAHN creation may be triggered, e.g., by the user device entering a predefined stop boundary of the stop device. Since the DAHN is established ad hoc, the server 410 is not required for the formation of the DAHN, and the DAHN may operate independently of the server 410 to share information among the user device 430, stop devices 450, vehicle devices 460, and other devices 470. The DAHN may be formed based on, e.g., information associated with a particular user route from Point A to Point B, including the various legs of a trip. The DAHN may be terminated upon completion of the user route. However, the server 410 via the controller 415 and/or the SOSIs may connect to the DAHN to additionally share information.

In operation 630, the server may receive, via another SOSI, user-vehicle stop information after connecting to the DAHN. Since there may be multiple vehicle stops in a user's route, each stop device may be incorporated into the DAHN and/or establish an independent connection to the server 410.

In operation 635, control information may be transmitted by the server 410 to the vehicle device VA 462 via an SOSI 414 related to the user when the user device is located within the stop boundary. As described above, such control information may comprise, e.g., instructions that are displayed to the driver to ensure that the user is seated on the vehicle or that the user needs assistance or that accessories, such as ramps, may need to be extended. The control information may also comprise direct automated control to vehicle or stop devices, such as initializing the extension of a ramp, or presenting on the display of a stop that it is safe for the user to board the vehicle.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising, on a network service and using a processor associated with the service:
    initializing information collectors and response monitors by loading configurations, user settings, and data structures to capture device information from a plurality of devices that each run a virtual agent (VA);
    establishing fifth generation (5G) communication links between 5G server orchestration service instances (SOSIs) and respective VAs on a plurality of the devices;
    receiving, from the plurality of devices and via a telco channel, captured live status information by the SOSIs;
    receiving, from a vehicle device VA, vehicle status information, and ingesting, by a first SOSI of the SOSIs, the vehicle status information, based on a predefined boundary associated with the vehicle;
    connecting to a 5G dynamic ad-hoc network (DAHN) comprising a user device of a user having a visual impairment and a vehicle stop device, a creation of the DAHN being triggered by the user device entering a predefined stop boundary of the stop device;
    receiving, by a second SOSI of the SOSIs, user-vehicle stop information after the connecting to the DAHN; and
    transmitting control information to the vehicle device VA related to the user when the user device is located within the stop boundary.

2. The method of claim 1, further comprising:
    continuously identifying current location information of the user device and user route location information of a user route, by receiving, via at least one of the SOSIs, information from a VA selected from the group consisting of the user device VA, the vehicle device VA, and a stop VA.

3. The method of claim 2, wherein the identifying of the user route location information comprises:
    identifying further information, within a boundary area associated with the user route, vehicle information, stop details, and transfer details; and
    transferring the further information to at least one of the SOSIs.

4. The method of claim 1, further comprising receiving information from the vehicle device related to vehicle accommodations.

5. The method of claim 4, wherein the vehicle accommodations are selected from the group consisting of available seating capacity and available aids to assist the user.

6. The method of claim 1, further comprising:
receiving user-provided data comprising a user destination location and user preferences from a user device VA.

7. The method of claim 1, further comprising transmitting haptic information to the user.

8. The method of claim 1, further comprising receiving conformation of successful user boarding from a device selected from the group consisting of the user device, the vehicle device, and the vehicle stop device.

9. The method of claim 1, further comprising, wherein the DAHN further comprises:
the vehicle device VA; and
a plurality of vehicle stop devices associated with a user route.

10. The method of claim 1, wherein the telco channel is a 5G telco channel.

11. The method of claim 1, further comprising:
determining that the user is waiting for a public transportation service within the predefined stop boundary.

12. The method of claim 11, wherein the determining of the user waiting is based on detected position and movement information.

13. A transportation system, comprising:
a processor configured to:
initialize information collectors and response monitors by loading configurations, user settings, and data structures to capture device information from a plurality of devices that each run a virtual agent (VA);
establish fifth generation (5G) communication links between 5G server orchestration service instances (SOSIs) and respective VAs on a plurality of the devices;
receive, from the plurality of devices and via a telco channel, captured live status information by the SOSIs;
receive, from a vehicle device VA, vehicle status information, and ingesting, by a first SOSI of the SOSIs, the vehicle status information, based on a predefined boundary associated with the vehicle;
connect to a 5G dynamic ad-hoc network (DAHN) comprising a user device of a user having a visual impairment and a vehicle stop device, a creation of the DAHN being triggered by the user device entering a predefined stop boundary of the stop device;
receive, by a second SOSI of the SOSIs, user-vehicle stop information after the connecting to the DAHN; and
transmit control information to the vehicle device VA related to the user when the user device is located within the stop boundary.

14. The system of claim 13, wherein the processor is further configured to:
continuously identify current location information of the user device and user route location information of a user route, by receiving, via at least one of the SOSIs, information from a VA selected from the group consisting of the user device VA, the vehicle device VA, and a stop VA.

15. The system of claim 14, wherein the identification of the user route location information comprises having the processor:
identify further information, within a boundary area associated with the user route, vehicle information, stop details, and transfer details; and
transfer the further information to at least one of the SOSIs.

16. The system of claim 13, further comprising receiving information from the vehicle device related to vehicle accommodations, wherein the vehicle accommodations are selected from the group consisting of available seating capacity and available aids to assist the user.

17. The system of claim 13, further comprising:
receiving user-provided data comprising a user destination location and user preferences from a user device VA.

18. The system of claim 13, further comprising receiving conformation of successful user boarding from a device selected from the group consisting of the user device, the vehicle device, and the vehicle stop device.

19. A computer program product for a transportation system, the computer program product comprising a computer readable storage medium having computer-readable program code embodied therewith to, when executed on a processor:
initialize information collectors and response monitors by loading configurations, user settings, and data structures to capture device information from a plurality of devices that each run a virtual agent (VA);
establish fifth generation (5G) communication links between 5G server orchestration service instances (SOSIs) and respective VAs on a plurality of the devices;
receive, from the plurality of devices and via a telco channel, captured live status information by the SOSIs;
receive, from a vehicle device VA, vehicle status information, and ingesting, by a first SOSI of the SOSIs, the vehicle status information, based on a predefined boundary associated with the vehicle;
connect to a 5G dynamic ad-hoc network (DAHN) comprising a user device of a user having a visual impairment and a vehicle stop device, a creation of the DAHN being triggered by the user device entering a predefined stop boundary of the stop device;
receive, by a second SOSI of the SOSIs, user-vehicle stop information after the connecting to the DAHN; and
transmit control information to the vehicle device VA related to the user when the user device is located within the stop boundary.

20. The computer program product of claim 19, wherein the code further causes the processor to:
continuously identify current location information of the user device and user route location information of a user route, by receiving, via at least one of the SOSIs, information from a VA selected from the group consisting of the user device VA, the vehicle device VA, and a stop VA.

* * * * *